(12) United States Patent
Hall et al.

(10) Patent No.: US 10,578,100 B2
(45) Date of Patent: Mar. 3, 2020

(54) HIGH-PRESSURE PUMP FOR USE IN A HIGH-PRESSURE PRESS (71) Applicant: Novatek IP, LLC, Provo, UT (US)

(72) Inventors: David R. Hall, Provo, UT (US); Scott Dahlgren, Alpine, UT (US)

(73) Assignee: NOVATEK IP, LLC, Provo, UT (US)

( * ) Notice: Subject to any disclaimer, the term of this patent is extended or adjusted under 35 U.S.C. 154(b) by 1454 days.

(21) Appl. No.: 14/188,805

(22) Filed: Feb. 25, 2014

(65) Prior Publication Data

US 2015/0240805 A1 Aug. 27, 2015
US 2018/0163720 A9 Jun. 14, 2018

Related U.S. Application Data (60) Provisional application No. 61/769,602, filed on Feb. 26, 2013, provisional application No. 61/772,757, filed on Mar. 5, 2013.

(51) Int. Cl.
*F04C 2/08* (2006.01)
*F04C 11/00* (2006.01)
*B30B 1/00* (2006.01)

(52) U.S. Cl.
CPC ............. *F04C 2/084* (2013.01); *B30B 1/003* (2013.01); *F04C 11/001* (2013.01)

(58) Field of Classification Search
CPC .. B30B 1/003; B01J 3/067; F04C 2/18; F04C 11/003; F04C 11/001; F04C 15/0073; F04C 2240/70; F04C 2/084; B29C 43/10; B29C 43/32

USPC .................................. 60/476; 425/77, 405.2
See application file for complete search history.

(56) References Cited

U.S. PATENT DOCUMENTS

| | | | |
|---|---|---|---|
| 3,649,816 A * | 3/1972 | Johnes | B21C 31/00 700/206 |
| 4,047,384 A * | 9/1977 | Saruwatari | F03C 1/007 417/904 |
| 4,529,362 A | 7/1985 | Ichiryu | |
| 4,707,988 A | 11/1987 | Palmers | |
| 5,394,709 A | 3/1995 | Lorentzen | |
| 5,778,671 A | 7/1998 | Bloomquist | |
| 5,819,574 A | 10/1998 | Yogo | |
| 6,123,533 A | 9/2000 | McBurnett | |
| 6,210,138 B1 | 4/2001 | Cortez | |
| 6,336,802 B1 * | 1/2002 | Hall | B01J 3/067 425/330 |
| 6,647,870 B2 | 11/2003 | Kohno | |
| 6,666,666 B1 | 12/2003 | Gilbert | |
| 6,722,270 B2 | 4/2004 | Koyama | |
| 6,758,656 B2 | 7/2004 | Maier | |

(Continued)

*Primary Examiner* — Shelley M Self
*Assistant Examiner* — Jared O Brown (57) ABSTRACT A high-pressure pump comprising an elongated casing and a hollow interior formed along a central axis thereof. At least one partition may be axially fixed within the elongated casing such that it divides the hollow interior. First and second pressure differential devices may be disposed on opposite sides of the at least one partition and each have a rotary shaft extending there through. A first rotary shaft extending through the first pressure differential device may be axially fixed by the at least one partition and rotationally fixed to a second rotary shaft extending through the second pressure differential device. The high-pressure pump may be driven by a servomotor and used in a high-pressure press.

20 Claims, 9 Drawing Sheets

(56) References Cited

U.S. PATENT DOCUMENTS

| | | |
|---|---|---|
| 7,051,526 B2 | 5/2006 | Geiger |
| 7,658,066 B2 | 2/2010 | Bildstein |
| 2003/0223896 A1* | 12/2003 | Gilbert .................. F04C 2/123 418/9 |
| 2004/0213680 A1 | 10/2004 | Suzuki |
| 2007/0101711 A1 | 5/2007 | Debus |
| 2010/0266437 A1 | 10/2010 | Martin-Dye |
| 2013/0126024 A1* | 5/2013 | Goss .................. F04C 14/04 137/565.01 |

* cited by examiner

HIGH-PRESSURE PUMP FOR USE IN A HIGH-PRESSURE PRESS

CROSS REFERENCE TO RELATED APPLICATIONS

This patent application claims priority to U.S. Provisional Pat. App. Nos. 61/769,602, filed on Feb. 26, 2013, and 61/772,757, filed on Mar. 5, 2013, which are incorporated herein by reference for all that they contain.

BACKGROUND OF THE INVENTION

The present invention relates generally to high-pressure pumps as are common in applications that use a high-pressure, high-temperature press, such as the manufacture of polycrystalline diamonds. More particularly, the present invention relates to high-pressure pumps that comprise a plurality of positive displacement pumps that are stacked to increase the overall pressure differential capabilities of the high-pressure pump. For example, a positive displacement pump may be able to generate only a limited pressure differential; when a higher pressure differential is desired, additional positive displacement pumps may be stacked to increase the overall pressure differential without exceeding the maximum allowable pressure differential across any solitary positive displacement pump.

Rotary gear pumps are well known types of positive displacement pumps employed to pump fluids from one location to another. Rotary gear pumps conventionally employ two gears having meshing teeth disposed within a housing to deliver fluid entering the housing from an inlet to an outlet. One of the toothed gears may be a drive gear rotated by a motor or other suitable means while the other gear may be a driven gear which is driven by the drive gear. An example of such a rotary gear pump can be found in U.S. Pat. No. 6,123,533 to McBurnett which discloses a positive displacement pump including a drive gear meshed with an idler gear. However, only a limited pressure differential may be able to be generated across such a rotary gear pump.

It may be desirable to combine two or more such positive displacement pumps together, creating a multi-stage operation, to increase the final discharge pressure. U.S. Pat. No. 6,666,666 to Gilbert discloses a pump comprising multiple, axially stacked positive displacement pumps. The stacked pumps are arranged within an outer retaining barrel in one or more stages. Drive and idler shafts extend axially through each stacked component. The entire stack of sections and crossovers between stages can be fit into the bore of a tubular barrel, compressed sealably together and retained therein. However, when generating extremely high pressure differentials in a particular stacked section, the pressure differential may cause the shafts used to drive the rotors to be displaced.

BRIEF SUMMARY OF THE INVENTION

In one aspect of the present invention, an elongated casing may comprise a hollow interior formed along a central axis. At least one partition may be axially fixed within the elongated casing such that it divides the hollow interior. This may be accomplished by a variety of methods. In one method, the at least one partition comprises an expandable exterior surface that may remain retracted during insertion into the hollow interior of the elongated casing and then expand to fix the at least one partition to the casing. In other methods, the at least one partition may be axially fixed to the elongated casing by a locking element extending through an exterior of the elongated casing.

First and second pressure differential devices may be disposed on opposite sides of the at least one partition and each have a rotary shaft extending there through. A first rotary shaft extending through the first pressure differential device may be axially fixed by the at least one partition. This may be accomplished by a variety of methods. In one method, the first rotary shaft comprises at least one appendage protruding there from such that the appendage is axially constrained by the partition. A thrust bearing may also be disposed between the appendage and the partition.

The first rotary shaft may also be rotationally fixed to a second rotary shaft extending through the second pressure differential device. This may be accomplished by a variety of methods. One method may comprise a male spline end on the first rotary shaft mating with a female spline end on the second rotary shaft. An alternative method may comprise the first and second rotary shafts mating through a coupling.

In some embodiments, the first rotary shaft drives a first parallel rotary shaft also extending through the first pressure differential device. The first parallel rotary shaft may also be axially fixed by the at least one partition. This may be accomplished by at least one appendage protruding from the first parallel rotary shaft and axially constrained by the partition. It may be necessary to offset the appendage of the first parallel rotary shaft from the appendage of the first rotary shaft. The first parallel rotary shaft may also be rotationally fixed to a second parallel rotary shaft extending through the second pressure differential device.

In various embodiments, the first and second pressure differential devices may each comprise either a solitary positive displacement gear pump or a plurality of positive displacement gear pumps. Fluid may pass from the first pressure differential device to the second pressure differential device through a channel in the at least one partition. The first and second pressure differential devices may be axially fixed within the elongated casing. At least one pressure transducer may extend through the elongated casing into the hollow interior. In some embodiments, the first rotary shaft may be connected to and driven by a servomotor.

In another aspect of the present invention, a high-pressure press may comprise a piston enclosing an expandable cavity. A bi-directional high-pressure pump may fluidly connect the expandable cavity to a reservoir. The bi-directional high-pressure pump may be capable of feeding fluid to the expandable cavity from the reservoir and also withdrawing fluid from the expandable cavity back to the reservoir. A servomotor may be used to control the bi-directional high-pressure pump. The bi-directional high-pressure pump may comprise a first rotary shaft axially fixed to a casing and rotationally fixed to a second rotary shaft. This may allow for a stack of pressure differential devices to build up pressure in the bi-directional high-pressure pump while preventing axial displacement of the rotary shafts.

In various embodiments, the high-pressure press may comprise a position transducer to identify the position of the piston or a pressure transducer to identify a pressure in the expandable cavity. A controller may receive input from the piston position transducer or expandable cavity pressure transducer to control the servomotor. In some embodiments, the high-pressure press may comprise a plurality of pistons operated simultaneously to compress a single chamber.

DETAILED DESCRIPTION OF THE INVENTION

Figure 1:
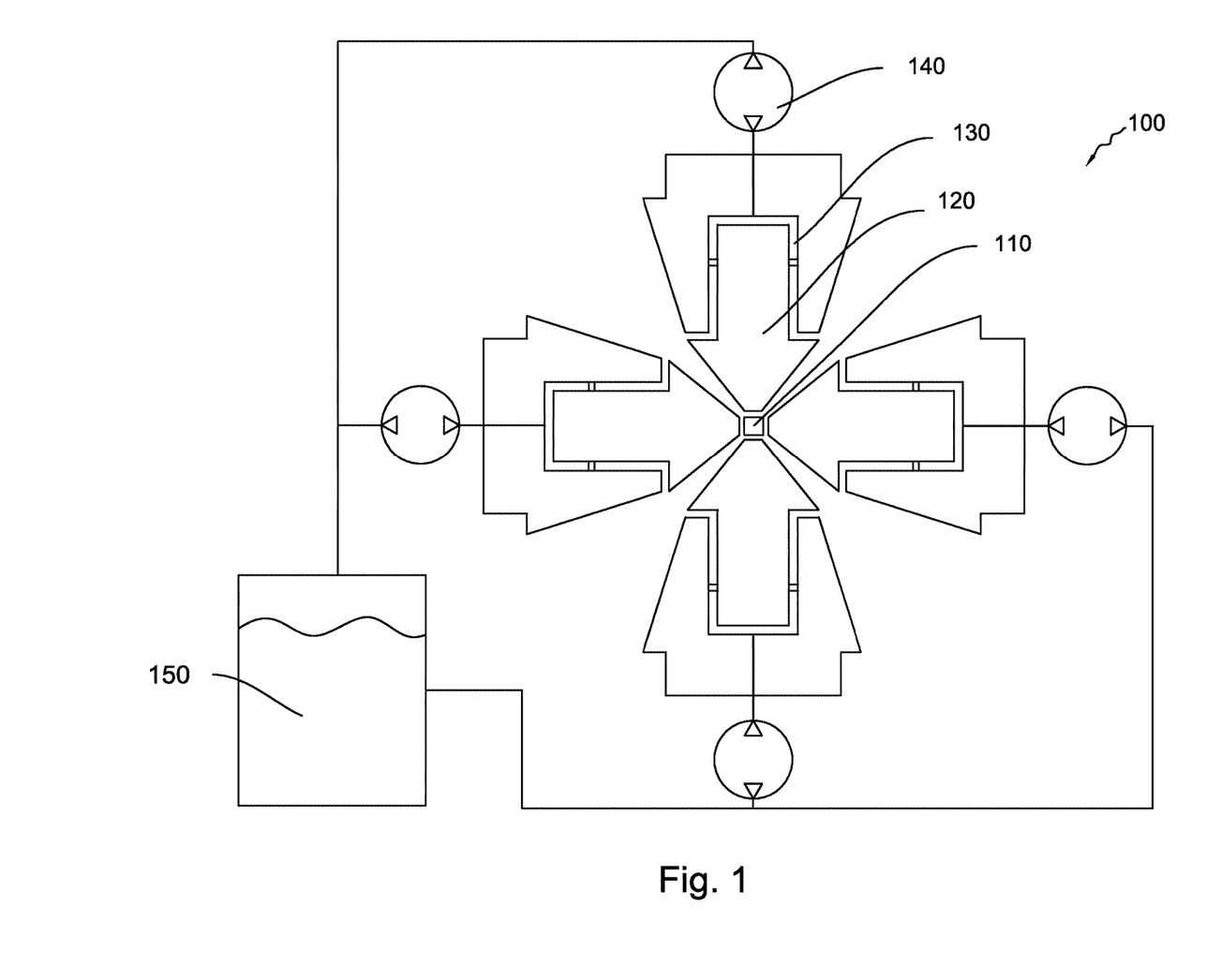
FIG. 1 is a diagram of an embodiment of a high-pressure press comprising bi-directional high-pressure pumps fluidly connecting a reservoir to expandable cavities of several pistons.

Referring now to the figures, FIG. 1 is a diagram of an embodiment of a high-pressure press 100 such as may be used to manufacture polycrystalline diamonds. In such operations, diamond grains may be mixed with catalyst, disposed in a canister and pressed under high pressure which allows for crystalline formation to sinter the grains together. Several canisters may disposed within a cube 110 placed between a plurality of pistons 120. Each of the plurality of pistons 120 may enclose an expandable cavity 130. Bi-directional high-pressure pumps 140 may port fluid back and forth between a reservoir 150 and each expandable cavity 130 to accurately extend and retract the plurality of pistons 120, thus applying pressure to cube 110.

Figure 2:
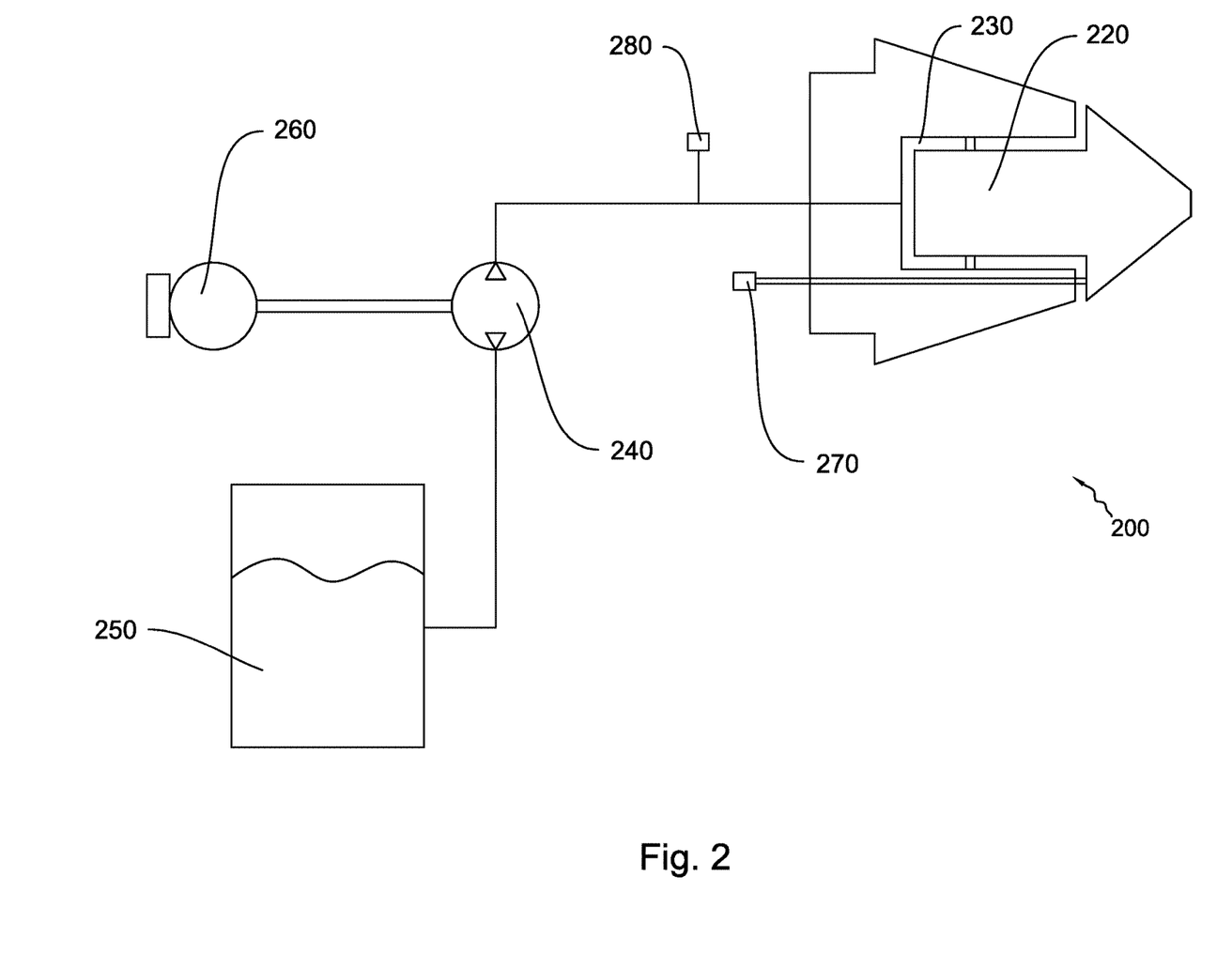
FIG. 2 is a diagram of an embodiment of a high-pressure press comprising a bi-directional pump controlled by a servomotor.

FIG. 2 is a diagram of another embodiment of a high-pressure press 200. A servomotor 260 may provide precise control for a bi-directional high-pressure pump 240 that may port fluid back and forth between a reservoir 250 and an expandable cavity 230 of a piston 220. In various embodiments, the servomotor 260 may receive feedback from either a position transducer 270 (such as a linear variable differential transformer) identifying a position of the piston 220 or a pressure transducer 280 identifying a pressure in the expandable cavity 230.

In practice, if the pressure transducer 270 measures a deficiency in pressure in the expandable cavity 230, the servomotor 260 may receive a feedback signal to operate the bi-directional high-pressure pump 240 to move fluid to pressurize the piston 220. Alternatively, if the position transducer 270 measures an undesirable position for the piston 220, the servomotor 260 may receive a feedback signal to operate the bi-directional high-pressure pump 240 to move fluid to reposition the piston 220. Unlike prior art systems that require a perpetually running motor to maintain fluid pressure, this servomotor 260 may be shut off if the pressure is to be held constant.

Figure 3:
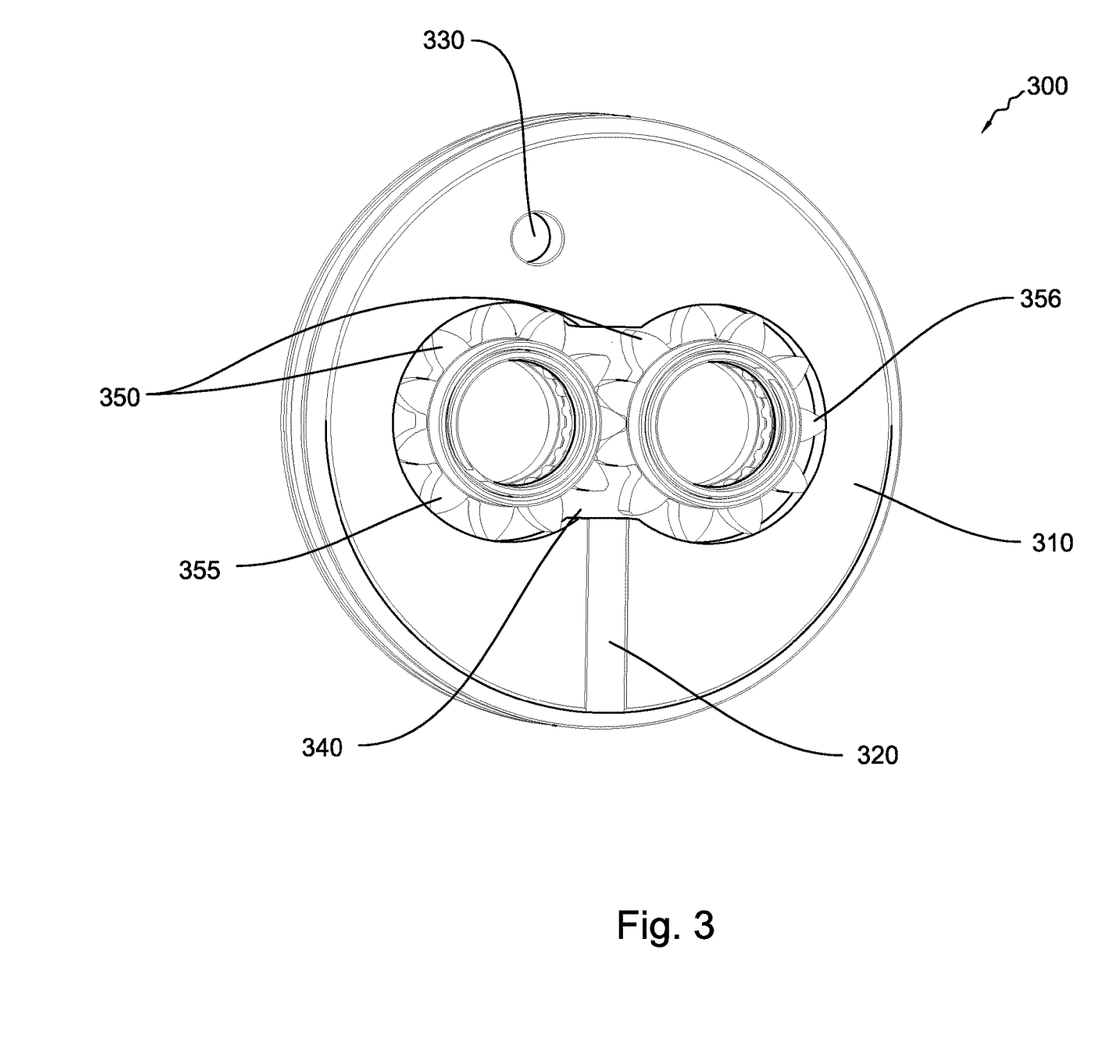
FIG. 3 is a perspective view of an embodiment of a positive displacement gear pump.

FIG. 3 shows an embodiment of a positive displacement gear pump 300. The positive displacement gear pump 300 may comprise a substantially cylindrical body 310 comprising a fluid inlet 320 and a fluid outlet 330. The fluid inlet 320 and fluid outlet 330 may be separated by a gear chamber 340 in which a pair of complementary gears 350 may be disposed. The pair of complementary gears 350 may prevent fluid from passing through the gear chamber 340 from the fluid inlet 320 to the fluid outlet 330. The pair of complementary gears 350 may comprise a drive gear 355 and a driven gear 356, such that the driven gear 356 rotates in a direction opposite to the direction of rotation of the drive gear 355.

When the drive gear 355 is actuated, a fixed amount of fluid is transported from the fluid inlet 320 to the fluid outlet 330 according to the rotation of the drive gear 355 and the driven gear 356. The pair of complementary gears 350 may be formed in any practical manner and from any convenient material known to persons skilled in the art, e.g. such as those used in conventional hydraulic gear pumps. Various modifications to provide deviations from ordinary tooth profiles may be made to obtain a higher efficiency and reduced pressure pulses and noise.

When the drive gear 355 is rotated in a reverse direction, fluid is transferred from the fluid outlet 330 to the fluid inlet 320. Thus the positive displacement gear pump 300 may be bi-directional.

Figure 4:
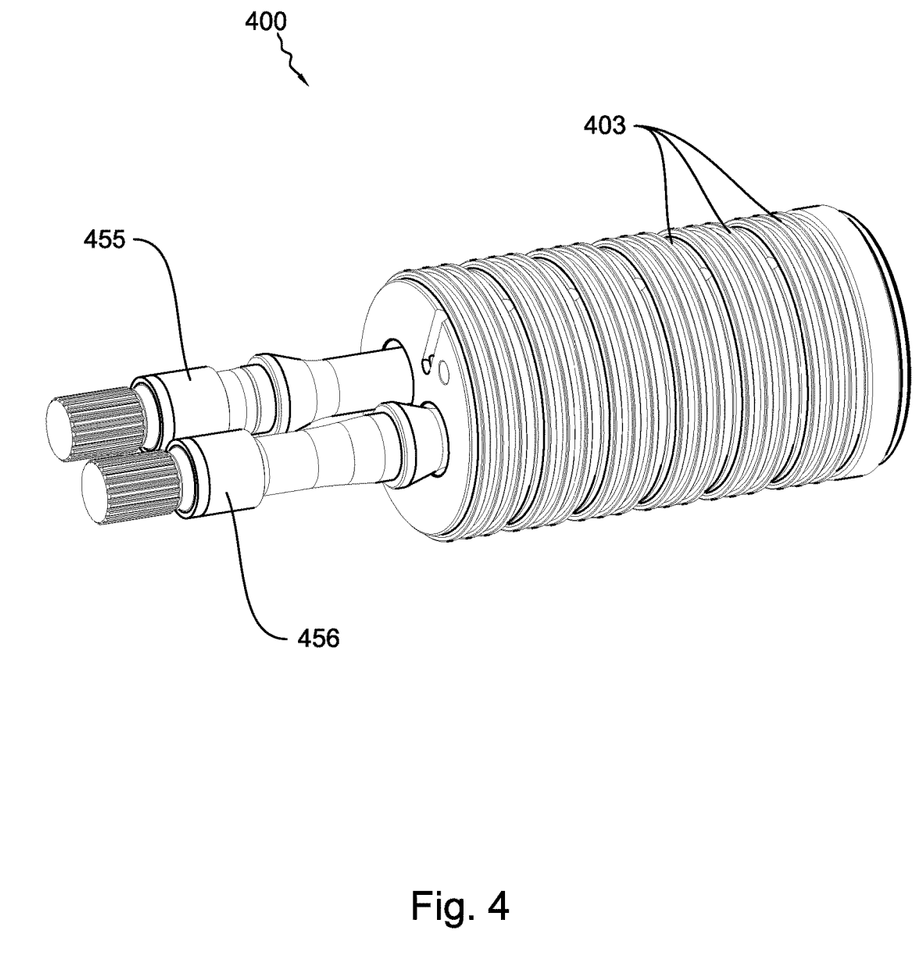
FIG. 4 is a perspective view of an embodiment of a pressure differential device comprising a plurality of positive displacement gear pumps.

FIG. 4 shows an embodiment of a pressure differential device 400 comprising a plurality of stacked positive displacement gear pumps 403. Each of the plurality of stacked positive displacement gear pumps 403 may create a pressure differential there across. The pressure differentials across each of the plurality of stacked positive displacement gear pumps 403 may add to the total pressure differential attainable across the pressure differential device 400. The pressure differential device 400 may further comprise a drive shaft 455 and a driven shaft 456 extending there through, parallel to a central axis thereof. The drive shaft 455 may rotate a plurality of drive gears (hidden) within each of the plurality of stacked positive displacement gear pumps 403 which may each be rotating driven gears (hidden) that together rotate the driven shaft 456.

As the total pressure differential attainable across the pressure differential device 400 increases, so does the force required to hold the plurality of stacked positive displacement gear pumps 403 together and to keep the drive shaft 455 and driven shaft 456 axially constrained.

Figure 5:
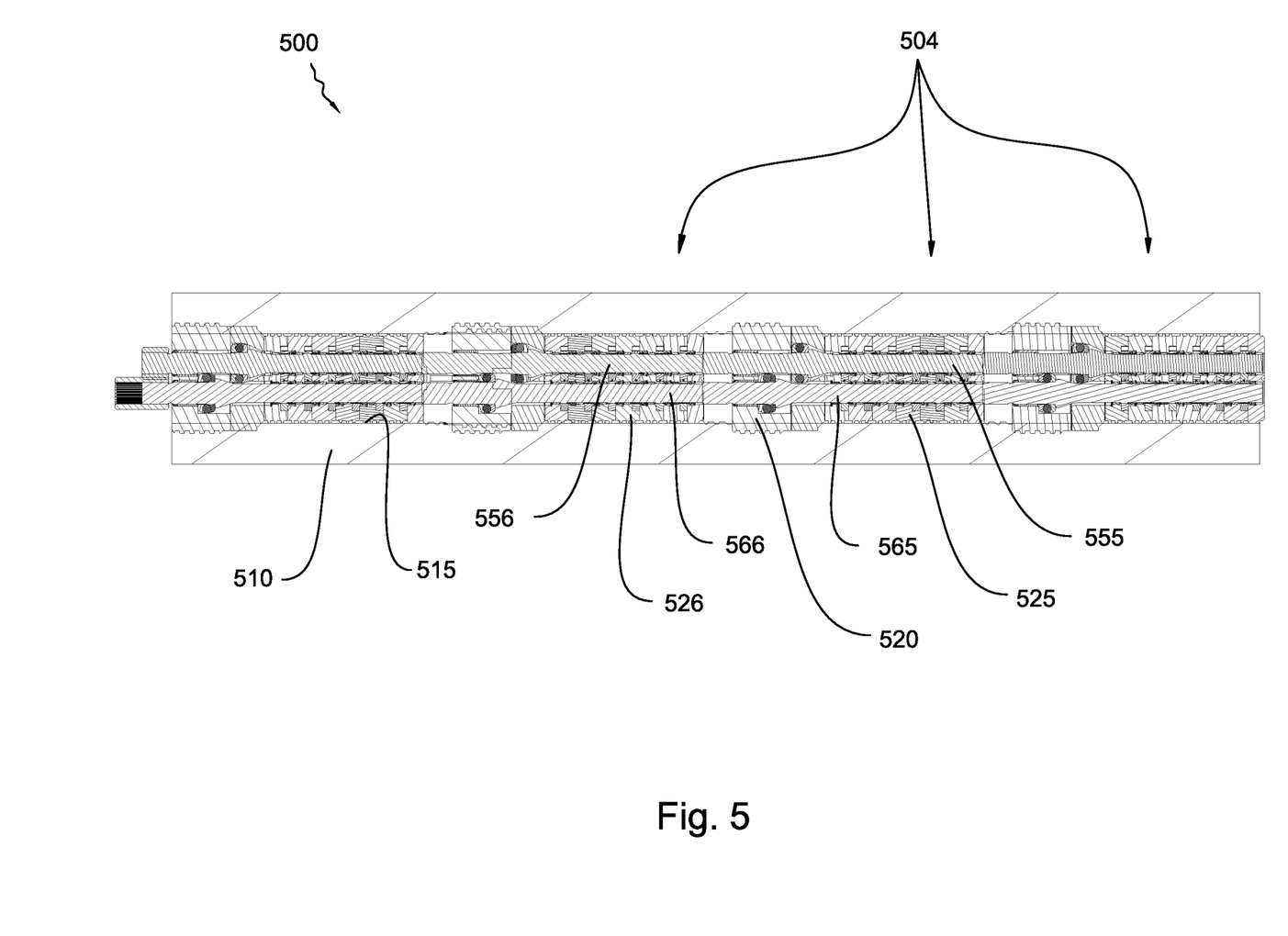
FIG. 5 is a longitudinal section view of an embodiment of a high-pressure pump.

FIG. 5 shows an embodiment of a high-pressure pump 500 comprising a plurality of pressure differential devices 504 disposed within an elongated casing 510. The elongated casing 510 may comprise a substantially hollow interior 515 formed along a central axis thereof. At least one partition 520 may be axially fixed within the elongated casing 510 such that it divides the hollow interior 515. This may be accomplished, in various embodiments, by threading the at least one partition 520 within the hollow interior 515 or inserting the at least one partition 520 into the hollow interior 515 and then expanding an exterior surface thereof. First and second pressure differential devices, 525 and 526 respectively, may be disposed on opposite sides of the at least one partition 520. A first rotary shaft 555 may extend through the first pressure differential device 525 and be axially fixed by the at least one partition 520. The first rotary shaft 555 may also be rotationally fixed with a second rotary shaft 556 extending through the second pressure differential device 526.

In some embodiments, the first rotary shaft 555 drives a first parallel rotary shaft 565 also extending through the first pressure differential device 525. The first parallel rotary shaft 565 may also be axially fixed by the at least one partition 520 and rotationally fixed to a second parallel rotary shaft 566 extending through the second pressure differential device 526.

This configuration may be desirable because the overall pressure differential across the high-pressure pump 500 is sustained by the casing 510. Each rotary shaft only bears the pressure associated with its corresponding pressure differential device. This allows extremely high pressure differentials to be achieved, as the casing 510 may be capable of withstanding higher pressures than any rotary shaft is able to withstand.

Figure 6:
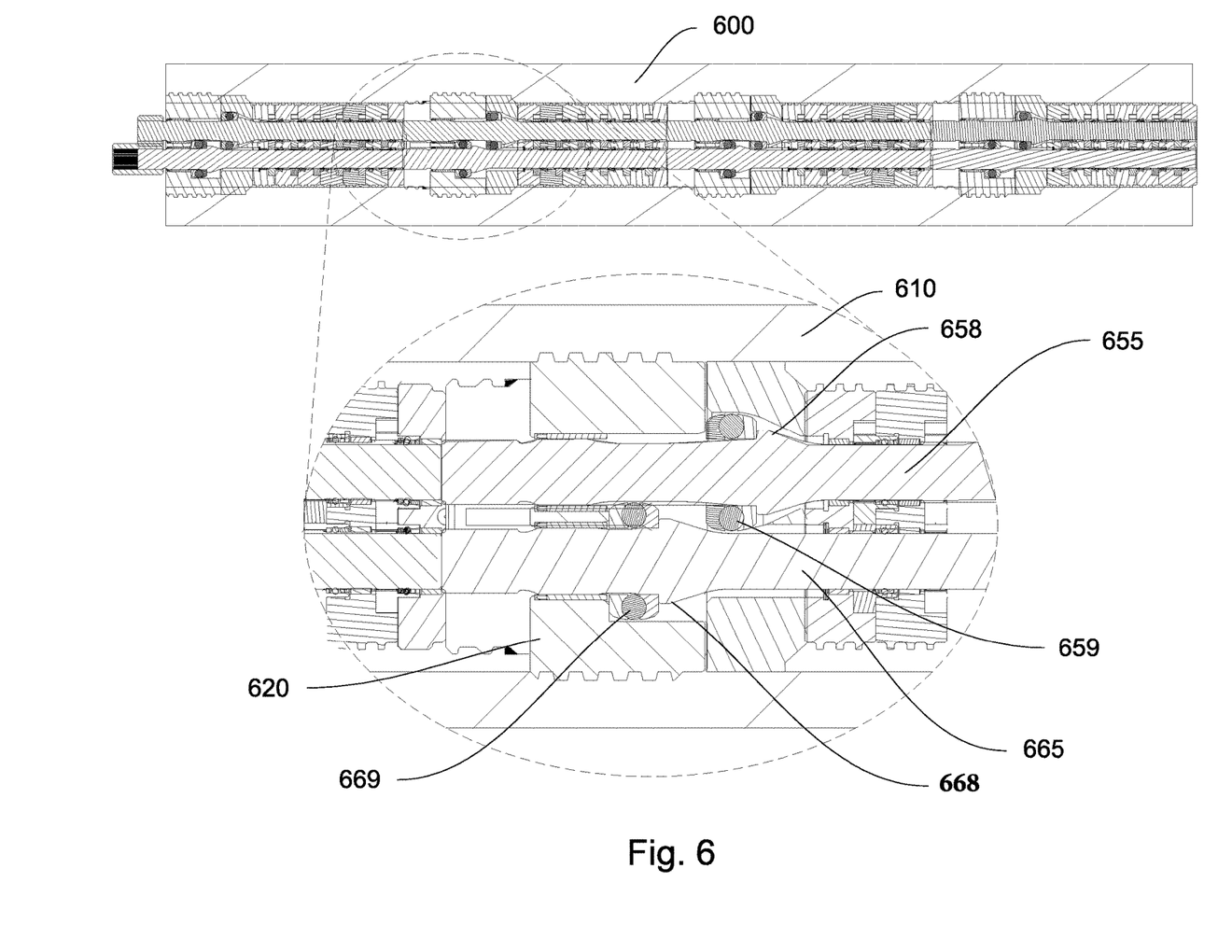
FIG. 6 is a magnified longitudinal section view of an embodiment of a high-pressure pump.

FIG. 6 shows a magnified view of a partition 620 axially fixed within an elongated casing 610 of a high-pressure pump 600. A first rotary shaft 655 may comprise at least one appendage 658 protruding therefrom. The at least one appendage 658 may be axially confined by the at least one partition 620 aided by a thrust bearing 659.

In some embodiments, the first rotary shaft 655 drives a first parallel rotary shaft 665. The first parallel rotary shaft 665 may also comprise at least one appendage 668 that is axially confined by the at least one partition 620 aided by a thrust bearing 669.

Figure 7A:
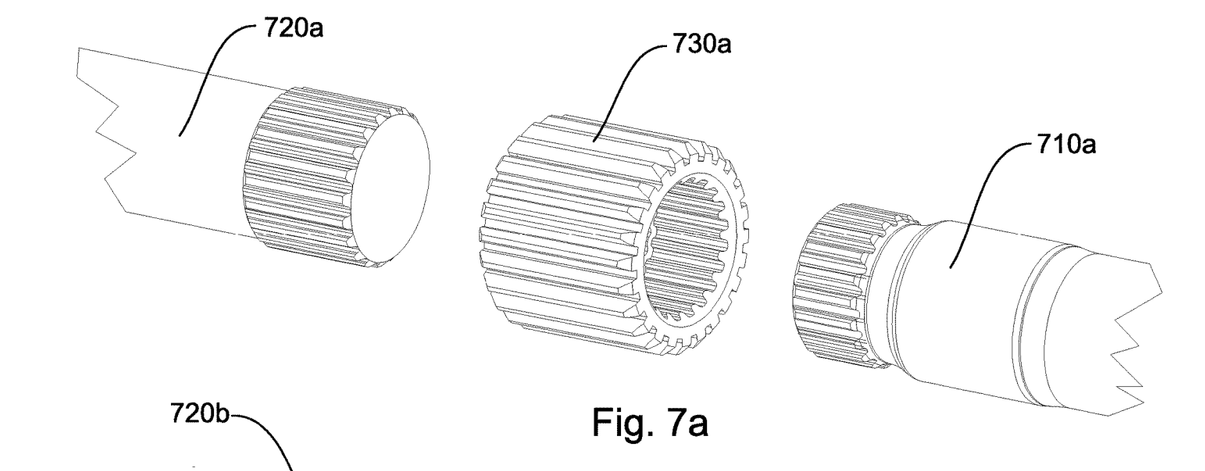
FIG. 7a is a perspective view of a first rotary shaft, a second rotary shaft and a coupling.
Figure 7B:
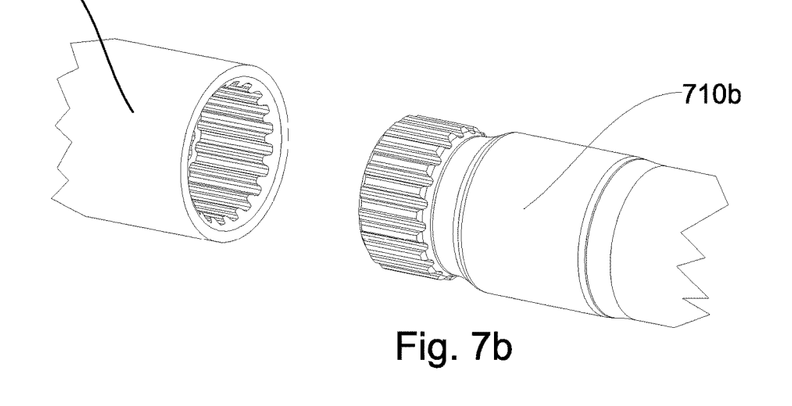
FIG. 7b is a perspective view of an embodiment of a first rotary shaft comprising a male spline end and a second rotary shaft comprising a female spline end.

FIGS. 7a and 7b show embodiments of various shaft connection assemblies that may allow for rotational fixation without axial fixation. These types of connections may allow for torque to be transferred without transferring axial thrust. Specifically, FIG. 7a shows first and second rotary shafts, 710a and 720a respectively, both comprising male spline ends that may mate with a female spline coupling 730a. FIG. 7b shows a first rotary shaft 710b comprising a male spline end that may mate with a second rotary shaft 720b comprising a female spline end.

Figure 8:
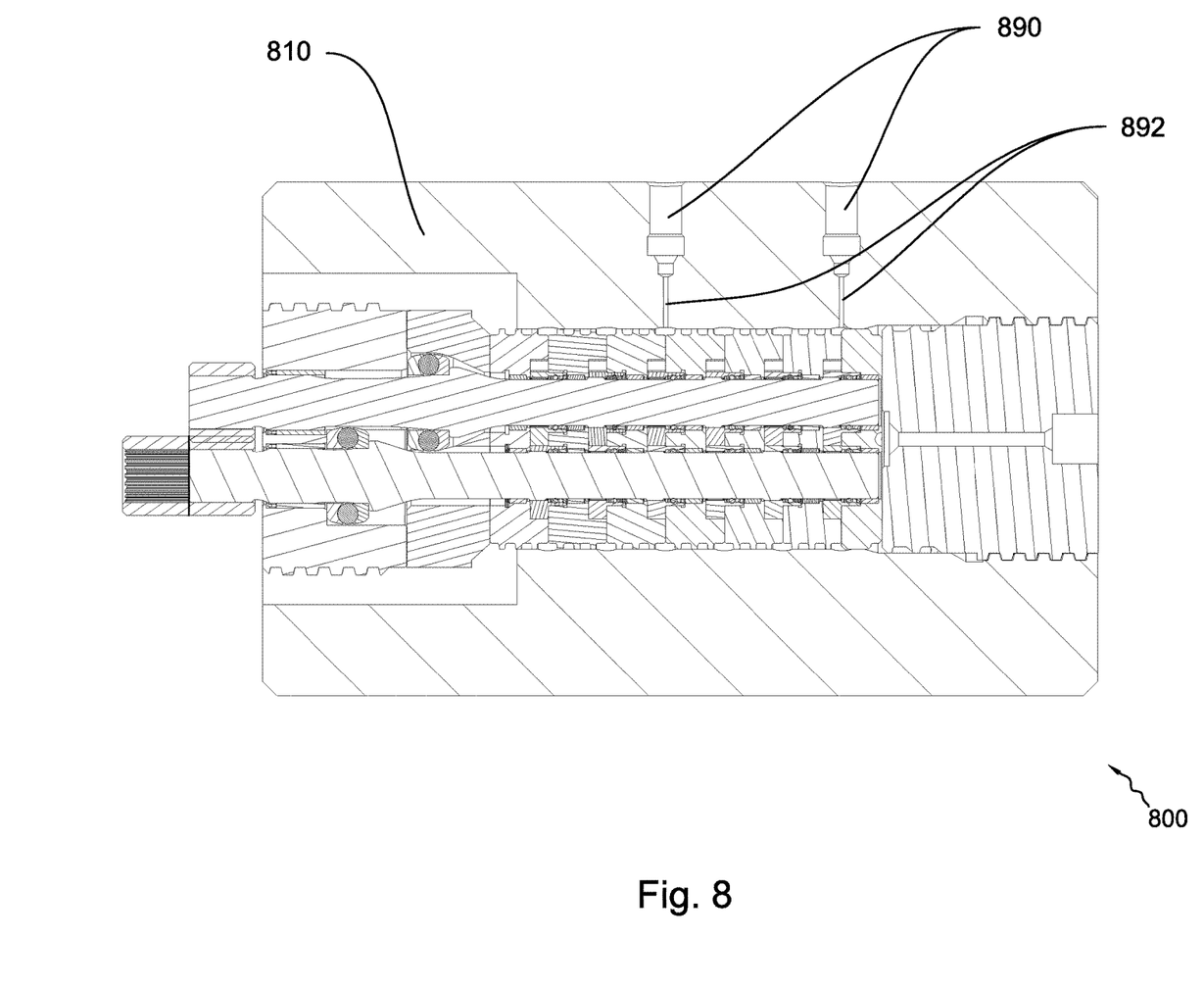
FIG. 8 is a longitudinal section view of an embodiment of a high-pressure pump comprising a pressure transducer.

FIG. 8 shows an embodiment of a high-pressure pump 800 comprising an elongated casing 810. Pressure transducers 890 may be disposed in holes 892 formed at various locations around the elongated casing 810 to allow for various pressure readings to be taken to monitor the pressures generated at different locations within the high-pressure pump 800. These pressure readings may be used to control the servomotor controlling the high-pressure pump.

Figure 9:
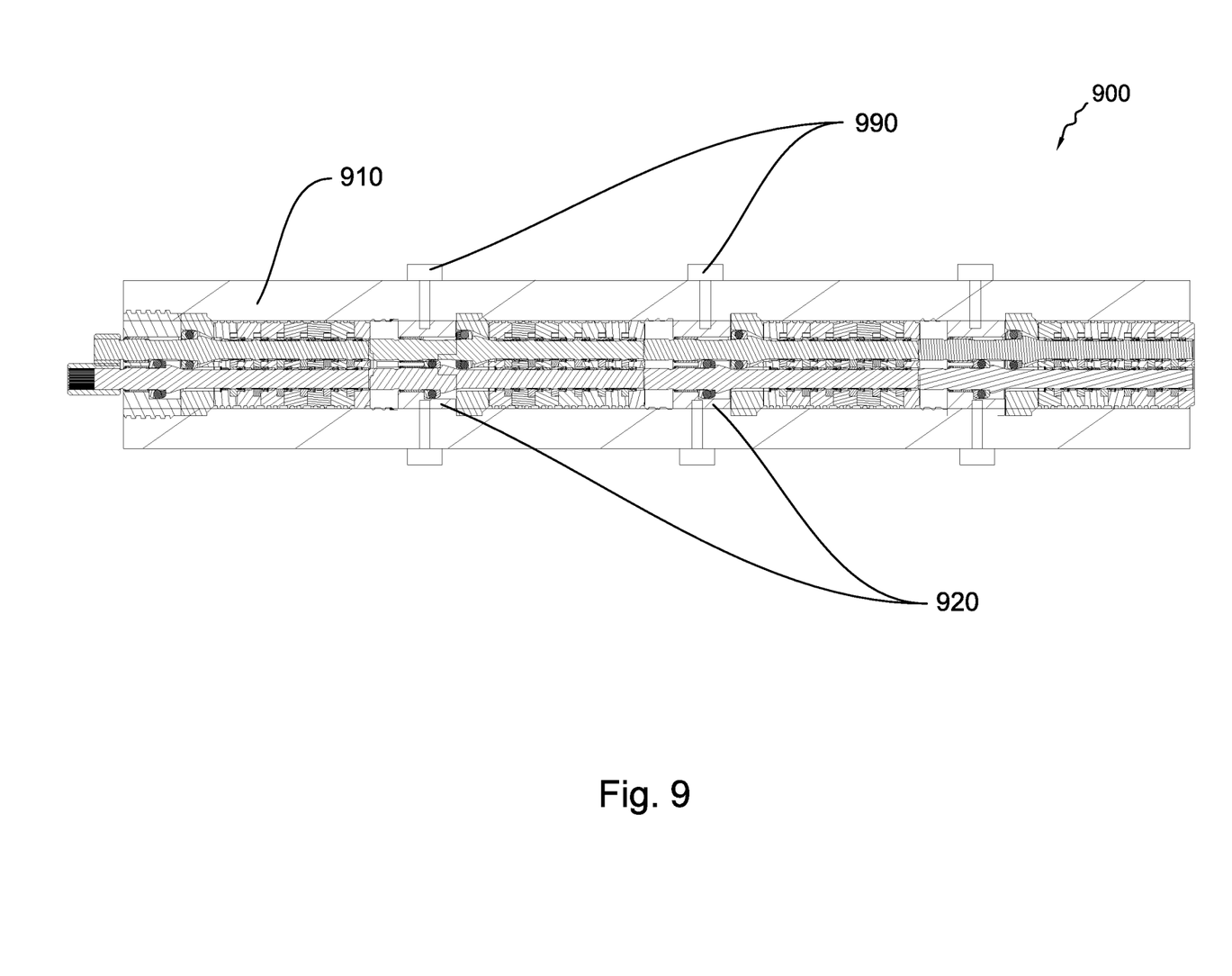
FIG. 9 is a longitudinal section view of an embodiment of a high-pressure pump comprising locking elements extending through a casing.

FIG. 9 shows an embodiment of a high-pressure pump 900 comprising an elongated casing 910 with locking elements 990 extending there through to axially fix partitions 920 disposed therein.

Whereas the present invention has been described in particular relation to the drawings attached hereto, it should be understood that other and further modifications apart from those shown or suggested herein, may be made within the scope and spirit of the present invention.

What is claimed is:

1. A press, comprising:
   a piston enclosing an expandable cavity;
   a casing having a hollow interior;
   a partition threaded within the hollow interior;
   a bi-directional pump in the hollow interior, wherein the bi-directional pump is fluidly connected to the expandable cavity, the bi-directional pump including:
   a first pressure differential device disposed in the hollow interior;
   a second pressure differential device in fluid communication with the first pressure differential device, the first pressure differential device is located at a first end of the partition and the second pressure differential device is located at a second end of the partition that is opposite from the first end;
   a first rotary shaft extending through the first pressure differential device to the partition, the partition axially fixing the first rotary shaft; and
   a second rotary shaft extending from the partition through the second pressure differential device, the second rotary shaft rotationally fixed to the first rotary shaft;
   a reservoir fluidly connected to the bi-directional pump; and
   a servomotor controlling the bi-directional pump.

2. The press of claim 1, further comprising a pressure transducer to identify a pressure in the hollow interior.

3. The press of claim 1, further comprising a controller that receives input from a piston position transducer or expandable cavity pressure transducer to control the servomotor.

4. The press of claim 1, further comprising a plurality of pistons operated simultaneously to compress a single chamber.

5. The press of claim 1, wherein the first rotary shaft comprises a male spline end mating with a female spline end of the second rotary shaft.

6. The press of claim 1, wherein the first rotary shaft mates with the second rotary shaft through a coupling.

7. The press of claim 1, wherein each of the first and second pressure differential devices comprises a solitary positive displacement gear pump.

8. The press of claim 1, wherein each of the first and second pressure differential devices comprises a plurality of positive displacement gear pumps.

9. The press of claim 1, wherein the partition comprises and is axially fixed by an expandable exterior surface.

10. The press of claim 1, wherein the partition is threaded into the casing.

11. The press of claim 1, wherein the partition includes three or more partitions.

12. The press of claim 1, the bi-directional pump fluidly connected to the expandable cavity with a single hydraulic line.

13. The press of claim 1, the partition including a thrust bearing.

14. The press of claim 13, an appendage protruding radially from the first rotary shaft, the appendage axially confined by the partition at the thrust bearing.

15. A press, comprising:
    a piston enclosing an expandable cavity;
    a casing having a hollow interior formed along a central axis;
    a partition axially fixed to the casing in the hollow interior, the partition including a thrust bearing;
    a bi-directional pump in the hollow interior, wherein the bi-directional pump is fluidly connected to the expandable cavity, the bi-directional pump including;
    a pressure differential device including a plurality of stacked positive displacement pumps, the partition dividing the plurality of stacked positive displacement pumps into a first portion and a second portion;
    a driven rotary shaft axially extending through the plurality of stacked positive displacement pumps;
    a parallel rotary shaft axially extending through the plurality of stacked positive displacement pumps, the partition axially fixing the driven rotary shaft, the parallel rotary shaft, or both the driven rotary shaft and the parallel rotary shaft along the central axis at the thrust bearing;
    a reservoir fluidly connected to the bi-directional pump; and
    a servomotor controlling the bi-directional pump.

16. The press of claim 15, wherein two or more partitions axially fix the driven shaft.

17. The press of claim 15, wherein the partition includes an expandable surface to engage an inner surface of the casing.

18. A press, comprising:
a first piston enclosing a first expandable cavity;
a first casing having a first hollow interior;
a first partition threaded within the first hollow interior;
a first bi-directional pump fluidly connected to the first piston, the first bi-directional pump including a first pressure differential device and a second pressure differential device in fluid communication with the first pressure differential device, and a first rotary shaft axially fixed to the first casing by the first partition and extending through the first pressure differential device and rotationally fixed to a second rotary shaft extending through the second pressure differential device;
a reservoir fluidly connected to the first bi-directional pump; and
a first servomotor controlling the first bi-directional pump to pressurize the first piston and reposition the first piston.

19. The press of claim 18, further comprising:
a second piston enclosing a second expandable cavity;
a second bi-directional pump fluidly connected to the second piston, the second bi-directional pump including a third pressure differential device and a fourth pressure differential device in fluid communication with the third pressure differential device, and a third rotary shaft axially fixed to a second casing and extending through the third pressure differential device and rotationally fixed to a fourth rotary shaft extending through the fourth pressure differential device;
a second servomotor controlling the second bi-directional pump to pressurize the second expandable cavity and reposition the second piston;
a third piston enclosing a third expandable cavity;
a third bi-directional pump fluidly connected to the third piston, the third bi-directional pump including a fifth pressure differential device and a sixth pressure differential device in fluid communication with the fifth pressure differential device, and a fifth rotary shaft axially fixed to a third casing and extending through the fifth pressure differential device and rotationally fixed to a sixth rotary shaft extending through the sixth pressure differential device;
a third servomotor controlling the third bi-directional pump to pressurize the third expandable cavity and reposition the third piston.

20. The press of claim 19, further comprising:
a fourth piston enclosing a fourth expandable cavity;
a fourth bi-directional pump fluidly connected to the fourth piston, the fourth bi-directional pump including a seventh pressure differential device and an eighth pressure differential device in fluid communication with the seventh pressure differential device, and a seventh rotary shaft axially fixed to a fourth casing and extending through the seventh pressure differential device and rotationally fixed to an eighth rotary shaft extending through the eighth pressure differential device;
a fourth servomotor controlling the fourth bi-directional pump to pressurize the fourth expandable cavity and reposition the fourth piston.

\* \* \* \* \*